United States Patent
Ahn et al.

(10) Patent No.: US 7,536,451 B2
(45) Date of Patent: May 19, 2009

(54) METHOD FOR INCREASING STANDBY TIME USING ACCESS HISTORY TO 1X EV-DO NETWORK WITH ACCESS TERMINAL AND DEVICE THEREOF

(75) Inventors: Byung-Ik Ahn, Goyang-si (KR); Ki-Hong Kim, Seoul (KR)

(73) Assignee: KTFREETEL Co., Ltd., Seoul (KR)

( * ) Notice: Subject to any disclaimer, the term of this patent is extended or adjusted under 35 U.S.C. 154(b) by 734 days.

(21) Appl. No.: 10/493,412

(22) PCT Filed: Sep. 24, 2002

(86) PCT No.: PCT/KR02/01798

§ 371 (c)(1),
(2), (4) Date: Apr. 22, 2004

(87) PCT Pub. No.: WO03/039039

PCT Pub. Date: May 8, 2003

(65) Prior Publication Data

US 2004/0243661 A1    Dec. 2, 2004

(30) Foreign Application Priority Data

Oct. 30, 2001    (KR) .................. 10-2001-0067107

(51) Int. Cl.
*G06F 15/173* (2006.01)
*G06F 15/16* (2006.01)
*H04W 4/00* (2006.01)
*H04W 72/00* (2006.01)
*H04W 1/00* (2006.01)

(52) U.S. Cl. ................... 709/223; 709/218; 709/224; 709/225; 709/226; 709/249; 455/434; 455/450; 455/466; 455/515; 455/552

(58) Field of Classification Search ................. 455/426, 455/434, 450, 466, 515, 552, 553
See application file for complete search history.

(56) References Cited

U.S. PATENT DOCUMENTS 5,764,730 A * 6/1998 Rabe et al. .................. 455/403
5,793,762 A * 8/1998 Penners et al. .............. 370/389
5,878,349 A * 3/1999 Dufour et al. ............... 455/438

(Continued)

OTHER PUBLICATIONS

Bi et al.; "Performance Analysis of 3G-1X EVDO High Data Rate System"; IEEE WCNC 2002, vol. 1, pp. 389-395, (2002).

(Continued)

*Primary Examiner*—Saleh Najjar
*Assistant Examiner*—Farzana Huq
(74) *Attorney, Agent, or Firm*—Finnegan, Henderson, Farabow, Garrett & Dunner, L.L.P.

(57) ABSTRACT

The present invention relates to a method for increasing standby time of mobile terminal and device thereof, and more particularly in a mobile terminal that performs voice and/or data communication by switching between at least two networks using different protocols, and method for increasing standby time using an access history and the device thereof. According to the present invention, the minimized hybrid operation can increase the standby time of the mobile terminal. Also, by minimizing hybrid operation of a plurality of IS-856 mobile terminals, the resource efficiency of the EV-DO network can be maximized.

6 Claims, 4 Drawing Sheets

U.S. PATENT DOCUMENTS

| | | | | |
|---|---|---|---|---|
| 6,009,325 | A * | 12/1999 | Retzer et al. | 455/434 |
| 6,026,300 | A * | 2/2000 | Hicks | 455/434 |
| 6,052,590 | A * | 4/2000 | Hicks et al. | 455/434 |
| 6,151,262 | A * | 11/2000 | Haroun et al. | 365/227 |
| 6,185,198 | B1 * | 2/2001 | LaDue | 370/329 |
| 6,243,579 | B1 * | 6/2001 | Kari | 455/426.1 |
| 6,282,182 | B1 * | 8/2001 | Pecen et al. | 370/336 |
| 6,307,880 | B1 * | 10/2001 | Evans et al. | 375/222 |
| 6,393,006 | B1 * | 5/2002 | Kajihara | 370/335 |
| 6,600,930 | B1 * | 7/2003 | Sakurai et al. | 455/414.3 |
| 6,717,928 | B1 * | 4/2004 | Kalliokulju et al. | 370/335 |
| 6,760,587 | B2 * | 7/2004 | Holtzman et al. | 455/436 |
| 6,771,964 | B1 * | 8/2004 | Einola et al. | 455/437 |
| 6,829,481 | B2 * | 12/2004 | Souissi | 455/436 |
| 7,016,359 | B2 * | 3/2006 | Naim et al. | 370/401 |
| 7,130,285 | B2 * | 10/2006 | Chang | 370/331 |
| 2001/0030953 | A1 * | 10/2001 | Chang | 370/331 |
| 2003/0125023 | A1 * | 7/2003 | Fishler | 455/426 |
| 2006/0013164 | A1 * | 1/2006 | Paryani | 370/329 |

OTHER PUBLICATIONS

Chekal et al.; "An Efficient Power Allocation Scheme in HDR Systems"; IEEE VTS 2001, vol. 4, pp. 2197-2201, (2001).

Jou; "Developments in Third Generation (3G) CDMA Technology"; IEEE SSTA 2000, vol. 2, pp. 460-464, (2000).

* cited by examiner

METHOD FOR INCREASING STANDBY TIME USING ACCESS HISTORY TO 1X EV-DO NETWORK WITH ACCESS TERMINAL AND DEVICE THEREOF

FIELD OF THE INVENTION

The present invention relates to a method for increasing standby time of a mobile terminal and a device thereof, and more particularly in a mobile terminal that performs voice and/or data communication by switching between at least two networks using different protocols, the method for increasing standby time using an access history and the device thereof.

BACKGROUND OF THE INVENTION

Presently, the wireless communication has developed from the second generation(circuit-switched network) to the third generation(packet-switched network). In Korea, the wireless communication system was upgraded from CDMAone(IS-95A) to CDMAone(IS-95B) and now to CDMA 2000 1xRTT (IS-95C; hereinafter "CDMA 1x"). When data transmission rates of each system are compared with each other, the maximum data transmission rate of IS-95A is 14.4 Kbit/s, the maximum data transmission rate of IS-95B is 64 Kbit/s and the maximum data transmission rate of CDMA 1x, which called as a third generation communication system is 144 Kbit/s.

As a matter of fact, CDMA 1x is not regarded as third generation but rather 2.5 generation because data transmission rate of CDMA 1x is faster than IS-95A or IS-95B; however, it is insufficient for the third generation standard adopted by ITU.

FIG. 1 illustrates the architecture of CDMA network importing CDMA 1x EV-DO network.

To improve the data transmission rate of CDMA 1x network 20, CDMA 1x EV-DO(Evolution Data-only; hereinafter "EV-DO") network 30 has been developed, and EV-DO network 30 is piled on the existing IS-95A/IS-95B network 10 and CDMA 1x network 20 for operation. EV-DO network 30 has 2.4 Mbit/s(minimum 600 Kbit/s) as maximum data transmission rate, and is a data transmission only network.

According to the import of EV-DO network 30 to CDMA 1x network 20, the existing CDMA 1x network 20 performs voice communication and EV-DO network 30 performs data communication. Accordingly, in order to perform the voice communication, an IS-856 mobile terminal that can operate on EV-DO network 30 has to periodically monitor a paging slot of CDMA 1x network by switching between existing CDMA 1x network 20 and EV-DO network 30. The paging slot monitoring starts when the mobile terminal operates in a slot mode.

Due to the periodical switching between CDMA 1x network 20 and EV-DO network 30(hereinafter "hybrid operation"), more power is consumed in the IS-856 mobile terminal than in the existing mobile terminal, and as a result, the standby time of the IS-856 mobile terminal becomes short.

DISCLOSURE OF THE INVENTION

To overcome the problem in the prior art described above, it is a primary object of the present invention is to provide a method for increasing standby time of a mobile terminal using access history of the data service by minimizing the hybrid operations for monitoring different networks and a device thereof.

It is another object of the present invention to provide a method for increasing standby time of a mobile terminal using access history to the data service, which method can maximize the resource efficiency of the EV-DO network, by minimizing the hybrid operations of a plurality of IS-856 mobile terminals.

To achieve the aforementioned objects according to a preferred embodiment of the present invention, there is provided a method and for increasing standby time of a mobile terminal that performs voice and/or data communication by switching between at least two networks using different protocol and a device thereof, wherein the method comprises step of receiving information for identifying the existence of a second network from a first network, step of identifying the existence of the second network by information received from the first network, step of referring access history of a user to the second network if the second network exists and step of converting a mode of the mobile terminal to a first network exclusive mode if there is no access history to the second network.

Here, the first network is for voice only or low-speed voice/data, and the second network is for high-speed data only, wherein the first network and the second network can coexist complementary to each other.

Also, the step of receiving information for identifying the existence of a second network from a first network comprises step of synchronizing the mobile terminal with the nearest base station using a pilot channel transmitted from the nearest base station and step of obtaining sync channel information required to communicate with the base station from a sync channel transmitted from the base station.

Also, the step of identifying the existence of the second network by information received from the first network is the step of identifying the existence of the second network by using an indicator, which indicates that the second network overlaps the first network, received from the first network. Here, the indicator is included in the sync channel information transmitted through the sync channel and indicates the existence of the second network.

Also, the step of referring access history of a user to the second network if the second network exists is the step of determining whether or not the user has used the second network by using a second network usage time stored in a memory of the mobile terminal.

The method for increasing standby time of a mobile terminal using access history to the data service further comprises step of converting the mode of the mobile terminal to a first network exclusive mode if the second network does not exist.

Also, the data communication, which should be performed through the second network, is performed through the first network in the first network exclusive mode.

According to another preferred embodiment of the present invention, there is provided a computer-readable medium including a program containing computer-executable instructions for performing the method for increasing standby time of a mobile terminal that performs voice and/or data communication, wherein the program practices the aforementioned method.

DETAILED DESCRIPTION OF THE PREFERRED EMBODIMENTS

Hereinafter a method for increasing standby time of a mobile terminal and a device thereof will be described with the accompanying drawings. However, it will be apparent that additional variations and modifications may occur in the embodiment of the present invention, and the spirit and the scope of the present invention cannot be limited by the following embodiment. The preferred embodiment of the present invention is provided in order to more fully describe the present invention to those who are skilled in the art.

Figure 1:
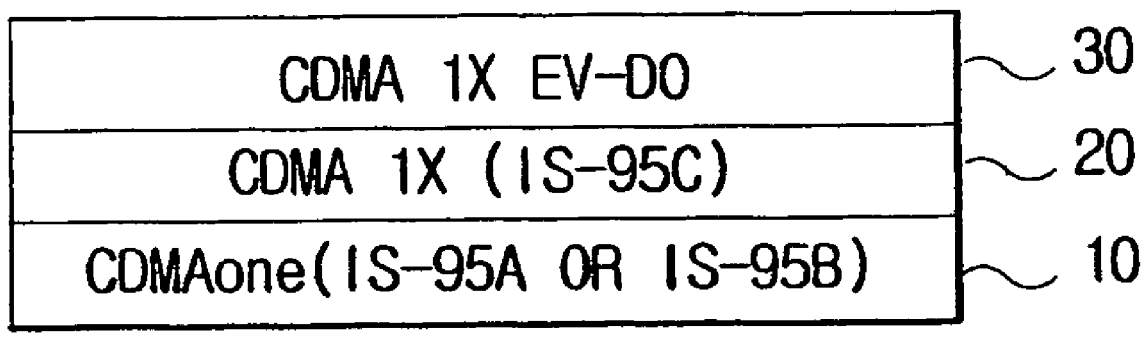
FIG. 1 illustrates the architecture of CDMA network importing CDMA 1x EV-DO network.
Figure 2:
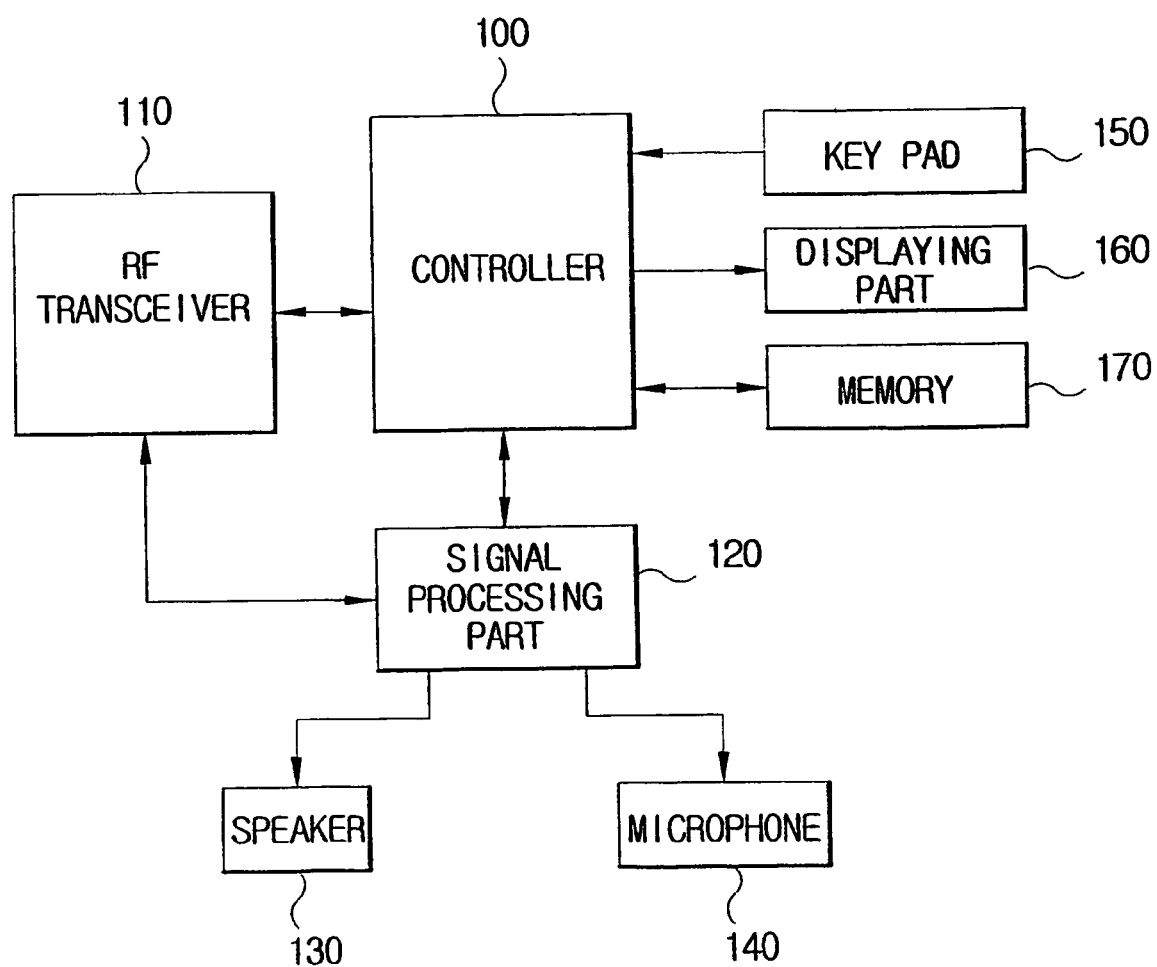
FIG. 2 is a schematic of IS-856 mobile terminal where the method for increasing standby time in accordance with a preferred embodiment of the present invention is shown.

FIG. 2 is a schematic of IS-856 mobile terminal where the method for increasing standby time in accordance with a preferred embodiment of the present invention is shown.

Referring to FIG. 2, the IS-856 mobile terminal comprises a controller 100, an RF transceiver 110, a signal processing part 120, a speaker 130, a microphone 140, a keypad 150, a displaying part 160 and a memory 170.

The controller 100 controls entire operations of the IS-856 mobile terminal, and particularly, executes wireless Internet platforms such as BREW(Binary Runtime Environment for Wireless), GVM(Game Virtual Machine), XVM(eXtended Virtual Machine) or KVM(Kilo Virtual Machine), and application programs such as a game, PIM(Personal Information Management), browser or mail program.

When a user turns on the power of the mobile terminal, the controller 100 identifies the existence of the EV-DO network by using an indicator obtained from the CDMA 1x network.

According to the identification, if the EV-DO network exists, the controller 100 continuously monitors a paging slot in the paging channel of the CDMA 1x network while maintaining a connection with the EV-DO network(hereinafter, "hybrid switching mode"). That is, due to the import of EV-DO network, a voice call and a data call are separately serviced by CDMA 1x network and EV-DO network.

According to the identification, if the EV-DO network does not exist, the controller 100 converts the mode of the mobile terminal to CDMA 1x exclusive mode so that the mobile terminal does not connect to the EV-DO network and, as a result, does not perform a hybrid operation. Then, a voice call and a data are transmitted through the CDMA 1x network.

RF transceiver 110, under the control of the controller 100, receives a voice call and data through an antenna from a base station and transmits a voice call and data to the base station. Also, RF transceiver 110 converts the wireless signal received through antenna to a digital voice signal and converts a digital voice signal received from the signal processing part 120 to a wireless signal.

If the EV-DO network exists, after connecting to the EV-DO network, the RF transceiver 110 performs the hybrid operation that is periodically to monitor the paging slot of CDMA 1x network. If the EV-DO network does not exist, or by the instruction of the controller 100, the RF transceiver 110 accesses to the CDMA 1x network and monitors the paging slot.

The signal processing part 120, under the control of the controller 100, demodulates the digital voice signal to be an analog voice signal that is outputted to the speaker 130 and modulates an analog voice signal inputted from the microphone 140 to be the digital voice signal that is outputted to the RF transceiver 110.

The keypad 150 comprises input keys provided with a plurality of numeric keys and function keys and a scan code generator. The conventional structure of the keypad 150 is well known and will not be further discussed herein.

The displaying part 160, under the control of the controller 100, is a device such as LCD and displays the IS-856 mobile terminal's condition or output of executed programs.

The memory 170 stores programs for operating the IS-856 mobile terminal and personal information of user.

Hereinafter, a conventional procedure of IS-856 mobile terminal for accessing the CDMA 1x network and the EV-DO network will be described with reference to the diagram in FIG. 2.

If a user turns on the power of the aforementioned mobile terminal, the controller 100 detects a pilot channel received through antenna by sequentially increasing or decreasing the frequency of the demodulating signal of the RF transceiver 110, and at the same time, comes to find a base station that the mobile terminal is under control by using the level of each demodulating signal.

And, after receiving a sync channel from the base station and obtaining information about the base station from the sync channel, the controller 100 synchronizes the mobile terminal with the base station and identifies EV-DO network by an indicator included in the sync channel. If EV-DO network exists, the controller 100 performs a registration to CDMA 1x network and EV-DO network by transmitting subscriber information stored in the memory 170 to the base station. Then, the controller 100 periodically monitors paging slot of CDMA 1x network for connecting a voice call while maintaining a connection to the EV-DO network. In one embodiment, the mobile terminal can simultaneously or sequentially access the CDMA 1x network or the EV-DO network by one access procedure. Also in another embodiment, the mobile terminal can simultaneously or sequentially access the CDMA 1x network or the EV-DO network by separate access procedures to each network. In the present invention, the EV-DO network exists on the higher level of CDMA 1x network, and as a result, once the mobile terminal accesses(e.g., searching base station, synchronizing and registering) the CDMA 1x network, the mobile terminal can monitor the paging slot of CDMA 1x network without an additional access procedure.

Conventional paging slots are set in an array of 16 to 2048 time slots and each paging slot has 80 m/s. In non-slot mode, the mobile terminal monitors messages of all paging slots in paging channel received from the base station. But in the slot mode, the mobile terminal monitors selectively a part of messages of paging slots in paging channel received from the base station. That is, in order to save the power of the mobile terminal, the power supplied to the receiving circuit is periodically shut off. The mobile terminal can extend the power supply of a battery by operating with the base station in slot mode.

If the EV-DO network does not exist, the controller 100 performs a conventional procedure to access the CDMA 1x network, and after accessing the CDMA 1x network, a request for data communication is serviced through the CDMA 1x network.

Figure 3:
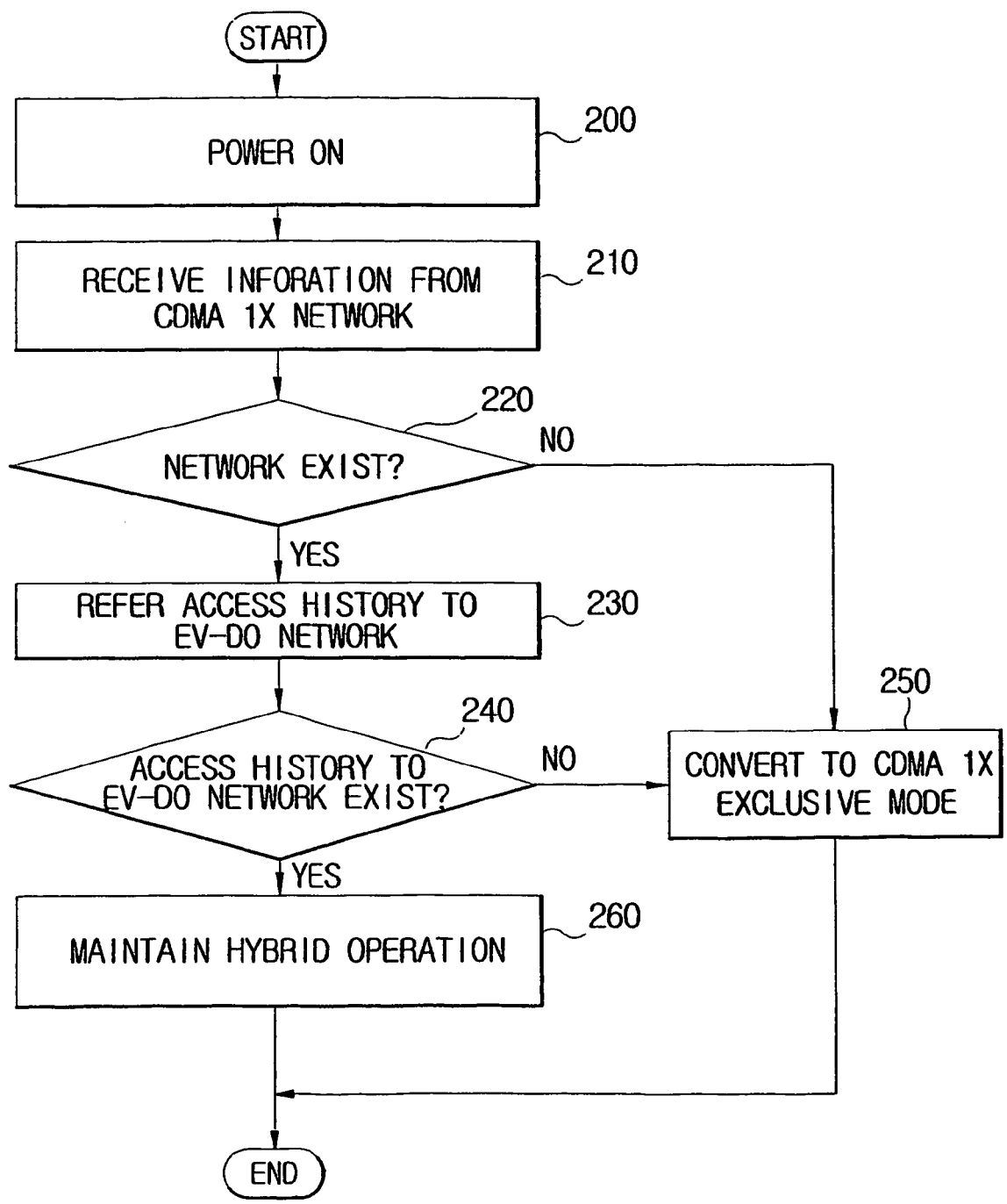
FIG. 3 is a flowchart illustrating the method for increasing standby time in accordance with the preferred embodiment of the present invention.

FIG. 3 is a flowchart illustrating the method for increasing standby time in accordance with the preferred embodiment of the present invention.

Referring to FIG. 3, at step 200, when a user turns on the power of the mobile terminal, the mobile terminal is initialized by an operating program stored in advance.

At step 210, the mobile terminal is synchronized with the nearest base station using a pilot channel transmitted from the nearest base station. And sync channel information required to communicate with the base station is obtained from a sync channel transmitted from the base station.

At step 220, the existence of EV-DO network is identified by using an indicator included in sync channel information. According to the identification using the indicator, if the EV-DO network exists, the method proceeds to step 230. According to the identification using the indicator, if the EV-DO network does not exist, the method proceeds to step 250.

At step 230, the access history to the EV-DO network is referred. The access history to the EV-DO network can be the total usage time of application for data communication stored in the memory. That is, it is possible to refer the access history of a user to the EV-DO network by storing the usage time of application such as a browser or a mail program that requires the EV-DO network to be used. The usage time is one selected from a group consisting of a total accumulated usage time and a just before usage time. Also, in another embodiment, the access history of user to the EV-DO network can be referred on the number of times of data communication through the EV-DO network stored in memory.

At step 240, according to the result of referral, if the access history to the EV-DO network exists, the method proceeds to step 260. If the access history to the EV-DO network does not exist, the method proceeds to step 250.

At step 250, if the user has never used the EV-DO network or the EV-DO network does not exists, the mode of the mobile terminal is converted to the CDMA 1x exclusive mode and then the mobile terminal accesses the CDMA 1x network. Accordingly, since the mobile terminal does not access the EV-DO network, the hybrid operation is not performed. Subsequently a voice call and a data communication are serviced through the CDMA 1x network.

At step 260, if the user has used the EV-DO network, the mobile terminal accesses the EV-DO network, and then periodically monitors paging slot of CDMA 1x network. The method for monitoring paging slot is well known in the art and will not be further discussed herein.

Figure 4:
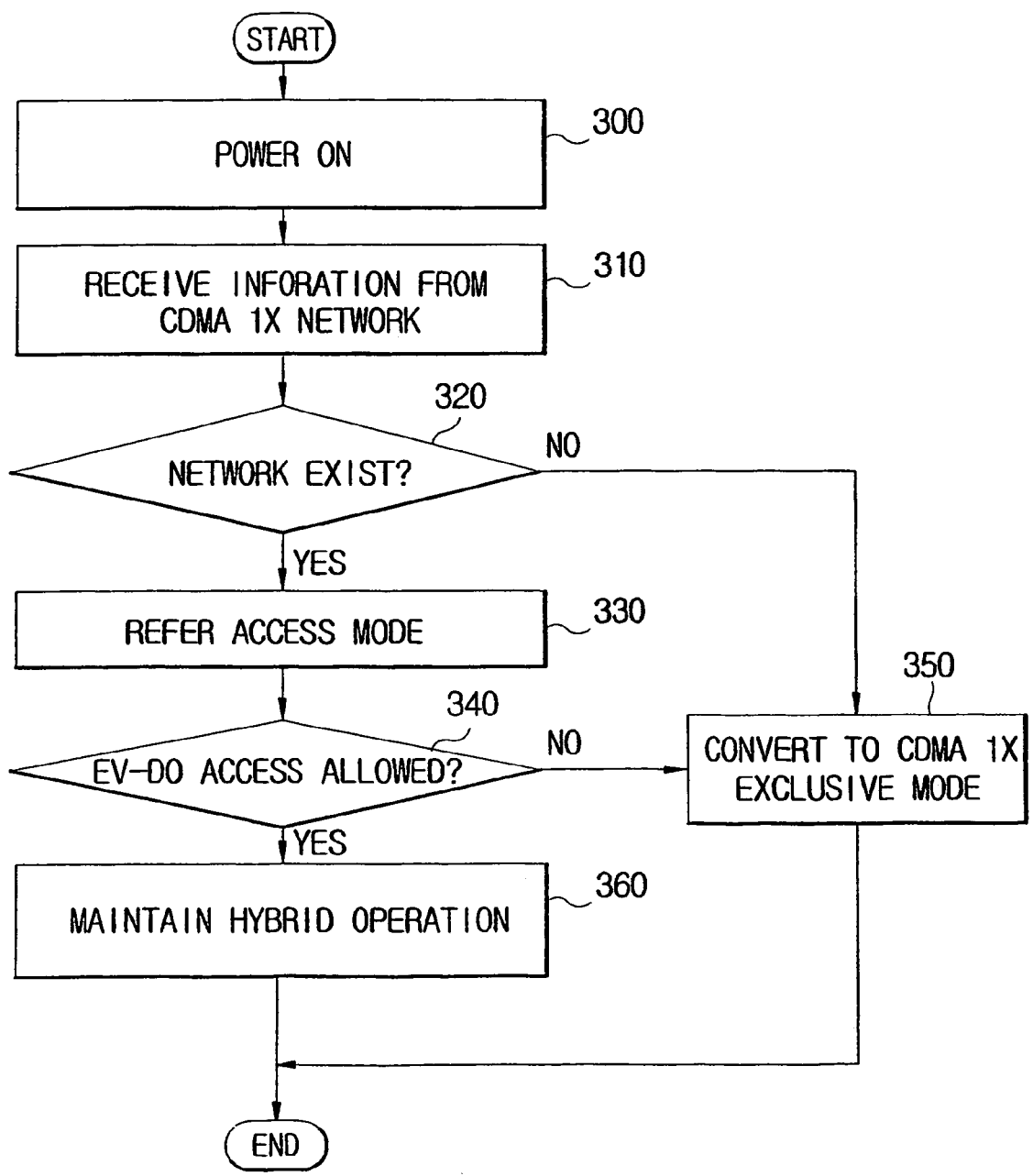
FIG. 4 is a flowchart illustrating the method for increasing standby time in accordance with another preferred embodiment of the present invention.

FIG. 4 is a flowchart illustrating the method for increasing standby time in accordance with another preferred embodiment of the present invention.

Referring to FIG. 4, at step 300, when a user turns on the power of the mobile terminal, the mobile terminal is initialized by an operating program stored in advance.

At step 310, the mobile terminal is synchronized with the nearest base station using a pilot channel transmitted from the nearest base station. And sync channel information required to communicate with the base station is obtained from a sync channel transmitted from the base station.

At step 320, the existence of EV-DO network is identified by using an indicator included in sync channel information. According to the identification by using the indicator, if the EV-DO network exists, the method proceeds to step 330. According to the identification by using the indicator, if the EV-DO network does not exist, the method proceeds to step 350.

At step 330, an EV-DO network access mode predetermined by a user is referred. The EV-DO network access mode can be stored in memory. By predetermining the EV-DO network access mode, it is possible to restrict access to the EV-DO network in the following cases: (1) a user does not want to use an application requiring EV-DO network such as a browser or a mail program in order to extend the standby time, (2) loss/theft of the mobile terminal or (3) a user wants to restrict other user to using the EV-DO network.

At step 340, according to the result of referral, if the EV-DO network access mode is in a restricted mode, then the method proceeds to step 360. If the EV-DO network access mode is in an allowed mode, then the method proceeds to step 350.

At step 350, if the EV-DO network access mode is in the restricted mode or the EV-DO network does not exist, the mode of the mobile terminal is converted to the CDMA 1x exclusive mode and then accesses the CDMA 1x network. Accordingly, since the mobile terminal does not access the EV-DO network, the mobile terminal does not perform the hybrid operation. Subsequently a voice call and a data communication are serviced through the CDMA 1x network.

At step 360, if the EV-DO network access mode is in the allowed mode, the mobile terminal accesses the EV-DO network, and then periodically monitors paging slot of CDMA 1x network.

While the present invention has been described with reference to the preferred embodiments thereof, those skilled in the art appreciate the fact that various changes in form and detail may be made without departing from the present invention as defined in the appended claims nevertheless.

Industrial Applicability

As has been described above, according to the present invention, the minimized hybrid operation can increase the standby time of the mobile terminal.

Also, by minimizing hybrid operation of a plurality of IS-856 mobile terminals, the resource efficiency of the EV-DO network can be maximized.

The invention claimed is:

1. A method for increasing standby time of a mobile terminal that performs voice and/or data communication by switching between at least two networks using different protocols, said method comprising the steps of:

receiving information for identifying the existence of a second network from a first network by using an indicator, the indicator indicating that the second network overlaps the first network;

identifying the existence of the second network by information received from the first network;

referring an access history of a user to the second network if the second network exists;

converting a mode of the mobile terminal to a first network exclusive mode if there is no access history to the second network;

converting the mode of the mobile terminal to the first network exclusive mode if the second network does not exist; and converting the mode of the mobile terminal to a hybrid switching mode if the access history of the second network exists, wherein the mobile terminal connected to the second network periodically monitors the first network in the hybrid switching mode, wherein the first network exclusive mode is a mode of the mobile terminal wherein the voice and/or data communication which should be performed through the second network is performed through the first network, and wherein the first network and the second network can coexist complementary to each other.

2. The method as stated in claim 1, wherein the first network is for voice only or low-speed voice/data, and the second network is for high-speed data only.

3. The method as stated in claim 1, wherein the step of receiving information for identifying the existence of a second network from a first network comprises the steps of:
   synchronizing the mobile terminal with the nearest base station using a pilot channel transmitted from the nearest base station; and
   obtaining sync channel information required to communicate with the base station from a sync channel transmitted from the base station.

4. The method as stated in claim 1, wherein the indicator is included in the sync channel information transmitted through the sync channel and indicates the existence of the second network.

5. The method as stated in claim 1, wherein the step of referring an access history of a user to the second network if the second network exists is the step of determining whether or not the user has used the second network by using a second network usage time stored in a memory of the mobile terminal.

6. A device for increasing standby time of a mobile terminal that performs voice and/or data communication by switching between at least two networks using different protocols, said apparatus comprising:
   means for receiving information for identifying the existence of a second network from a first network by using an indicator, the indicator indicating that the second network overlaps the first network;
   means for identifying the existence of the second network by information received from the first network;
   means for referring an access history of a user to the second network if the second network exists; and
   means for converting a mode of the mobile terminal to a first network exclusive mode if there is no access history to the second network, converting the mode of the mobile terminal to the first network exclusive mode if the second network does not exist, and converting the mode of the mobile terminal to a hybrid switching mode if the access history of the second network exists,
   wherein the mobile terminal connected to the second network periodically monitors the first network in the hybrid switching mode,
   wherein the first network exclusive mode is a mode of the mobile terminal wherein the voice and/or data communication which should be performed through the second network is performed through the first network, and
   wherein the first network and the second network can coexist complementary to each other.

* * * * *